350-3.61 SR

XR 3,850,633

United States X 3040W

Moraw et al.

[11] 3,850,633

[45] Nov. 26, 1974

[54] PROCESS FOR THE PRODUCTION OF HOLOGRAMS

[75] Inventors: Roland Moraw, Naurod; Gunther Schadlich; Renate Schadlich, both of Wiesbaden, all of Germany

[73] Assignee: Kalle Aktiengesellschaft, Wiesbaden-Bierbrich, Germany

[22] Filed: May 19, 1972

[21] Appl. No.: 255,136

[30] Foreign Application Priority Data

May 21, 1971 Germany .......................... 2125110

[52] U.S. Cl. ........................ 96/27 H, 96/49, 96/75, 96/88, 96/91 R, 96/91 D, 96/115 R, 350/3.5, 355/2

[51] Int. Cl. .......................... G03c 5/04, G03c 5/18

[58] Field of Search .......... 350/3.5; 355/2; 96/27 H, 96/35.1, 36, 91 R, 91 D, 75, 38.3

[56] References Cited

UNITED STATES PATENTS

| | | | |
|---|---|---|---|
| 3,580,657 | 5/1971 | Sheridon | 350/3.5 |
| 3,606,519 | 9/1971 | Kurtz | 350/3.5 |
| 3,612,641 | 10/1971 | Eaglesfield | 350/3.5 |
| 3,615,123 | 10/1971 | Wuerker | 350/3.5 |
| 3,623,798 | 11/1971 | Sheridon | 350/3.5 |
| 3,633,986 | 1/1972 | Broussard et al. | 350/3.5 |
| 3,644,012 | 2/1972 | Brooks | 350/3.5 |
| 3,658,526 | 4/1972 | Haugh | 350/3.5 |
| 3,661,582 | 5/1972 | Broyde | 96/91 D |
| 3,669,673 | 6/1972 | Chung Sen et al. | 91/27 H |
| 3,695,744 | 10/1972 | Clay | 350/3.5 |
| 3,759,711 | 9/1973 | Rauner et al. | 96/27 H |

OTHER PUBLICATIONS

Nakajimi et al., "Copied Phase Hologram of Photoresist," Fujitsu Sci. Tech. Journal, (Japan), vol. 6, no. 3, 9/1970.

Beesley et al., "Applied Optics," Vol. 9, No. 12, 12/1970, p.2720–2724.

Friesem et al., "Applied Optics," Vol. 5, No. 6, 6/1966, p. 1085–1086.

Trolinger et al., "Applied Optics," Vol. 7, No. 8, 8/1968, p. 1640–1643.

Urbach et al., "Applied Optics," Vol. 8, No. 11, 11/1968, p. 2269–2281.

Norman, S., "Optical Spectra," 11/1970, Vol. 4, No. 10, p. 26–30.

Kosar, J., "Light-Sensitive Systems," Wiley & Sons, 1965, p. 197–201.

*Primary Examiner*—Charles L. Bowers, Jr.
*Attorney, Agent, or Firm*—James E. Bryan

[57] ABSTRACT

This invention relates to an improvement in the process for the production of holograms on transparent light-sensitive recording material in which a hologram of an image is recorded or copied by means of actinic light, the image is optionally reconstructed from the hologram by means of non-actinic light, and then at least one further image is recorded or copied onto the same material. The improvement comprises using a recording material having a light-sensitive layer on a transparent support, said light-sensitive layer containing a light-sensitive aromatic diazonium salt, a light-sensitive quinone diazide, or a light-sensitive aromatic substituted nitrone.

16 Claims, No Drawings

3850633
OR IN 96/27H

PROCESS FOR THE PRODUCTION OF HOLOGRAMS

This invention relates to a process for the production of holograms on light-sensitive recording material, the production being performed by direct recording or by duplication of a hologram original.

It is known that a number of various light-sensitive recording materials may be used for recording or duplicating holograms. For this purpose, silver halogenide materials, bichromate-gelatin layers, diazo layers, metal halogenide layers applied by vapor depostion, photopolymer layers, thermoplastic photoconductor layers, and photochromic layers have been recommended, for example.

Holography is the recording of the total information content stored in amplitude and phase changes of the irradiated light. For this purpose, the light-sensitive recording material is exposed to the radiation of two coherent component rays, the so-called reference ray being directly beamed upon the recording material and the so-called image ray being previously image-wise changed by an object. An image-wise modulated interference pattern is reproduced on the recording material, from which the image used for modulation can be made visible again by radiation through the hologram. The light sources preferably used therefor are lasers.

A conventional laser type is the He/Ne-Laser which emits coherent light of 632.8 nm. Silver halogenide layers suitable for holographic purposes are therefore often specially sensitized for light of this wavelength. From the holograms produced with a certain wavelength, e.g. of 632.8 nm, it is also possible to reconstruct, with scale alteration, images with coherent light of another wavelength. Technical development also has involved so-called UV lasers emitting coherent light below about 450 nm. It is thus possible to produce holographic recordings on recording materials which are light-sensitive in the short-wave or ultraviolet spectral range, e.g., photoresist layers.

In contradistinction to the silver halogenide layers, with which primarily amplitude holograms are obtained by blackening the photographic layer and only secondarily phase holograms are produced by a bleaching process, in the case of photo lacquers phase holograms are usually obtained immediately after development since, depending upon the lacquer type, the exposed or the unexposed layer parts are removed during development. Phase holograms are also obtained by recording on photoconductive thermoplastic layers. These layers are charged, image-wise exposed, and heated, the softened layer forming a relief image upon the action of the charge image. Such relief images may be erased by heating and new relief images may be formed.

Holography, inter alia, is suitable as a recording process for the microfilm field since the stored information can be recovered substantially uninfluenced by disturbances on the recording material, such as dust or scratches. Furthermore, it is possible to record several holograms one upon the other. The application of holography in a recording system is also facilitated in that holograms can be duplicated in a simple manner in contact.

For holographic recording of information occurring in a time sequence and to be available intermediately by reconstruction of the image, e.g., for holographic data stores, recording materials are required which can be provided with recordings successively several times and from which, intermediately, information can be recovered by reconstruction. This is principally possible with photoconductive thermoplastic layers, but these layers have the disadvantage that, upon every further recording, the relief patterns already present are weakened. Furthermore, the storability of the relief images on thermoplastic layers is principally limited since the cold flow of the thermoplastic material effects levelling of the relief images upon longer storage.

Photochromic recording materials also may be used for the same purpose. With them, it is possible to perform recording with shortwave, e.g., ultraviolet, light and to carry out reconstruction with visible light reduced in energy since the photochromic color change generally takes place in the visible range of the spectrum. Such recordings have the disadvantage that they have a limited storability only. They are erased gradually upon storage and more rapidly upon heating or irradiation with longer-wave light (e.g., He/Ne-Laser).

Multiple amplitude holograms also can be recorded on materials carrying a lead iodide layer on a thin layer of metallic silver. Recording is performed with wavelengths below 520 nm, decomposition into lead and iodine taking place and the exposed areas becoming transparent. Reconstruction is possible with the He/Ne-Laser, no change of the layer occurring. Fixation is comparatively cumbersome and is performed by vapor-depositing an $SiO_2$ layer. Furthermore, the light intensity obtained with phase holograms cannot be obtained by the reconstruction of amplitude holograms.

The present invention provides a process by means of which it is as simple as possible to record holograms on suitable lightsensitive recording materials and from which holograms images can be reconstructed immediately thereafter while maintaining the lightsensitivity. It should be possible to repeat the cycle of recording and reconstructing several times, and the image information fed successively should be permanently fixable at the end. All or part of the information optionally should be erasable.

The present invention provides a process for the production of holograms on transparent light-sensitive recording material, in which a hologram of an image is recorded or copied by means of actinic light, the image is optionally reconstructed from the hologram by means of non-actinic light and then at least one further image is recorded or copied onto the same material.

In the process of the present invention, a recording material is used which carries a light-sensitive layer on a transparent support or embedded in the surface thereof, which light-sensitive layer contains, as the light-sensitive substance, an aromatic diazonium salt, a quinone diazide or an aromatic nitrone, and the material is optionally fixed with desensitization after the last desired exposure.

According to a preferred embodiment of the process, a recording material is used which contains an aromatic diazonium salt as the light-sensitive substance. After exposure and without further treatment, holograms are obtained from which images of high light-intensity can be reconstructed. Fixation is performed in this case by alkaline development in the presence of a coupling component as is usual in the diazotype field. This means that the coupling component is added to the light-sensitive layer a priori and development is carried out with wet ammonia gas, or that the coupling component is caused to act upon the layer as a constituent of an aqueous alkaline developer solution.

In another preferred embodiment of the process, a recording material is used which contains a quinone diazide as the light-sensitive substance. With this material also, images can be directly reproduced from the exposed layer but it is particularly advantageous to intensify the record by immersing the exposed material into a developer solution conventional for quinone diazide layers, e.g, an aqueous alkaline solution, and subsequently drying. Fixation is not necessary with this embodiment; if desired, it may be performed by full exposure.

In the present invention, actinic light means ultraviolet or short-wave visible light up to about 500 nm. Suitable light sources, correspondingly, are UV lasers, e.g. argon ion lasers, or for copying UV lamps, e.g. mercury vapor lamps. For reconstruction, laser light of a wavelength distinctly above the actinic range, e.g., the red light of the He/Ne-Laser of 632.8 nm, is used.

The process of the present invention relates to the recording of holograms of an object on light-sensitive material as well as to the reproduction or duplication of original holograms, e.g. holograms recorded on silver film material, by contact exposure on the light-sensitive material used in accordance with the invention.

The light-sensitive materials used in the present process are known in the reproduction field. They have a transparent support, e.g., a plastic film, a glass plate or the like, and a light-sensitive layer on or in the surface thereof.

Suitable light-sensitive substances are aromatic diazonium salts conventional in the diazotype field for the production of photoprinting material. Examples of suitable diazonium salts are benzene diazonium salts with a secondary or tertiary amino group in the 4-position, e.g. 4-dimethylamine-benzene diazonium chloride, 4-(N-ethyl-N-hydroxyethyl)-amino-benzene diazonium chloride, 4-morpholino-benzene-diazonium chloride, 4-pyrrolidino-benzene diazonium tetrafluoroborate, 4-phenylamino-benzene diazonium sulfate, 4-benzoylamine-2,5-diethoxy-benzene diazonium chloride, 4-morpholino-2,5-diethoxy-benzene diazonium chloride, 4-diethylamino-2-chloro-5-(p-chlorophenoxy)-benzene diazonium chloride, 4-pyrolidino-3-methyl-benzene diazonium chloride, 4-diethylamino-3-chlorobenzene diazonium tetrafluoroborate, benzene diazonium salts with a tertiary amino group in the 2-position, e.g. 2-dimethylamino-4-methoxy-benzene diazonium chloride, benzene diazonium salts with a mercapto group in the 4-position, e.g. 4-ethylmercapto-2,5-diethoxy-benzene diazonium chloride, and the like.

Quinone diazides which can be used as light-sensitive compounds are described in German Pat. Nos. 854,890; 865,109; 865,410; 930,608; 938,233, and 960,335, for example. They may derive substantially from 1,4-benzoquinone, 1,2-benzoquinone, 1,4-naphthoquinone, and 1,2-naphthoquinone. Preferred are the naphthoquinone-(1,2)-diazides, particularly those which carry the diazide group in the 2-position, preferably the esters of their 4- or 5-sulfonic acids.

Nitrones which may be used as light-sensitive substances within the scope of the present invention are described in German Offenlegungsschrift No. 1,447,010, for example.

The diazonium salts are either incorporated by diffusion sensitization into the surface of the supporting film consisting of cellulose acetate, for example, or applied as a coating, if desired with the addition of binders or other additives, to the surface of the film or of the transparent support. Plastic films suitable as supports are, in addition to those of cellulose esters, particularly polyester, polycarbonate, and polyimide films.

For the performance of the process of the invention, either a hologram duplicate is produced in the light-sensitive material in contact under an original hologram with parallel actinic light or a hologram is recorded in the light-sensitive material by means of the interference pattern of two laser beans of a wavelength in the actinic range and modulated by an object.

When the material contains a diazonium salt layer, a hologram is obtained immediately upon exposure from which the image can be reconstructed by means of light of longer wavelengths. It is thus possible, during the holographic recording, to irradiate the recording range of the light-sensitive material with longer-wave laser light, to observe the production of the hologram during exposure, and to finish it when the desired image brightness is achieved, for example.

The recorded hologram can be stored, with the exclusion of actinic light, until the next recording. The storability of the recorded hologram is limited only by the storability of the unexposed material, which usually is at least a few months and, under suitable conditions, up to several years.

On the same area of the light-sensitive material, it is possible to make in known manner further recordings or copies in the form of superimposed holograms with alteration of the spatial frequency or with alteration of the polarization plane of the irradiated light.

When no further holograms are to be recorded on a material containing a diazonium salt, the material is fixed by coupling the undecomposed diazonium compound to give an azo dye. The color of the holographic recording changes thereby from yellow to the color of the corresponding azo dye. In many cases, the brightness or light intensity of the reproduced images still increases after fixation. It is advantageous to select the azo coupling component in such a manner that the azo dye obtained absorbs as little as possible in the wave range of the reconstruction light.

The working method is similar when the light-sensitive material used is a film carrying a layer of a quinone diazide. In this case, the recording material is immersed after exposure into a developer solution as used for developing exposed quinone diazide layers, e.g., in the photomechanical production of offset printing plates. Suitable developers are weakly alkaline aqueous salt solutions, e.g., of alkali phosphates or alkali silicates, to which small quantities of organic solvents optionally may be added. Also dilute solutions of organic bases may be used.

Treatment with the developer should be carried out as carefully as possible. Particularly, the otherwise conventional wiping over of the layer surface with the developer solution should be avoided. The immersion time depends upon the type and the thickness of the layer as well as upon the activity of the solution. Generally, an action of between about 10 seconds to 1 minute is sufficient. The material is then dried and, after thorough drying, the recordings are resistant and relatively insensitive to rubbing and other mechanical action. For maintaining the light-sensitivity, the material is stored in the dark as long as further recordings must be produced.

In the described treatment with developer solution, the layers are probably swollen image-wise. In contradistinction to the images of layers the thickness of which has been image-wise reduced by partial dissolution, the images reconstructed from the swollen holograms have a very low background in the reconstruction with transmitted light as well as with reflected light. O-quinone diazides with more than one quinone diazide group in the molecule have proved particuarly suitable.

It is also possible to add other constituents, e.g., dyes and in small quantities alkali-soluble resins, to the quinone diazide layers, but preferably used are resin-free layers since images richest in contrast can be reconstructed with them, particularly with the use of the preferable o-naphthoquinone diazides.

It is possible to erase parts of the recordings, e.g., discrete sub-holograms by full exposure, if the above-described development has not been carried out.

Under suitable conditions, it is also possible to perform the holographic recording process of the invention with light-sensitive layers exhibiting a color change. Upon exposure of o-naphthoquinone diazides, indene carboxylic acids are obtained as the photochemical reaction product. It is therefore possible to change the color of the layer parts by color indicators in the layer which change upon the decrease of the pH value. After the holographic recording with ultraviolet light, holograms are immediately obtained on such light-sensitive layers from which images can be reconstructed with red laser light, advantageously with green light. The unexposed layer parts exhibit no color change and can be used for further recordings.

It is suprising that, according to the process of the invention, holograms are obtained solely by exposure to light and yield images of considerable brightness or light intensity. It is further surprising that, in the case of quinone diazide layers, this brightness can be very considerably increased by simple immersion into a developer solution. This is even more surprising since the layers consist practically exclusively of low-molecular weight constituents. It has even been found that, with the addition of higher-molecular weight constituents, e.g., of alkali-soluble condensation resins, the advantageous effect of the swelling treatment is considerably reduced or even entirely lost so that, according to the process of the invention, no image brightnesses sufficient for practical purposes can be achieved with layers containing a larger proportion of resin — about in the quantity of weight of the light-sensitive substance.

The holographic recording process of the invention is suitable for holographic data recording in general, especially of data occurring at different dates. It is particularly suitable for recording data in a binary form since relatively weak image differentiations after correspondingly short exposure times are sufficient therefor. A particular advantage of the material exhibiting color change upon exposure or development is that, in addition to the holographic recording, it is possible to copy, at a suitable place, information as an optical character or as an alphanumeric character.

The following examples illustrate embodiments of the process of the invention. They were performed with the use of a special UV laser and a red light laser. The process also can be performed with wavelengths other than those given thereby. If not stated otherwise, all percentages and ratios are by weight. The relationship between parts by weight and parts by volume is the same as that between the gram and the ml.

Example 1

A hologram was recorded on a silver halogenide film of a resolution of 1,500 lines/mm and a high light-sensitivity (Scientia 14 C 70 of Messrs. Agfa-Gevaert AG) which had been sensitized for He/Ne-Laser light. Recording was performed with a triangle arrangement, part of the laser beam (He/Ne-Laser Type G1 50 S of Messrs. Messer Griesheim GmbH, Frankfurt, 2mW, 632.8 nm) being laterally deflected by means of a beam splitter and directed as a reference beam via a mirror onto the light-sensitive layer. The non-deflected part of the laser beam also came on the light-sensitive layer through a scattering disc and a transparent original, in the present case through a line original conventional in reprography for testing resolutions. The cutting angle of the two partial beams determines the spatial frequency, that means the number of interference lines per millimeter which are reproduced on the light-sensitive layer without a scattering disc and without an original. This spatial frequency was 35 lines/mm in the case of the present hologram original. The exposed silver halogenide film was developed and fixed in known manner. A duplicate of the hologram obtained was produced on a diazo film which had been produced as follows:

A cellulose acetate film was coated with a solution of 2.6 parts by weight of citric acid,
6.0 parts by weight of thiourea,
1.4 parts by weight of 2-hydroxy-3-naphthoic acid-($\beta$-hydroxy-ethyl)-amide,
1.75 parts by weight of 3-hydroxy-4-methyl-phenylurea,
1.2 parts by volume of formic acid,
7.0 parts by weight of 4-diethylamino-benzene diazonium tetrafluoroborate,
38.0 parts by volume of water, and
48.0 parts by volume of isopropanol and dried.

The diazo film obtained was exposed for 15 seconds layer upon layer under the hologram original to the portion of light at 365 nm of a mercury lamp of 200 watts. The diazo film thus exposed was irradiated without development with the reference beam used above, the line original becoming visible thereby. Duplication and reconstruction were performed under yellow room lighting. Until further use, the diazo film was stored in the dark.

Another hologram was copied according to the above process with a spatial frequency of 110 lines/mm upon the hologram copied on the diazo film, both holograms being arranged parallel to one another with respect to the carrier frequencies. When viewing the diazo film with the red laser light, the image reconstructed from the first and that reconstructed from the second duplicated hologram could be observed on the screen at different deflection angles. Until further use, the diazo microfilm was again stored in the dark.

For stabilizing the holograms duplicated on the diazo film, the diazo film was exposed to wet ammonia gas. The color changed from yellow to greyish-brown thereby. Reconstruction of the two images was further possible, the images appearing even somewhat brighter than before development. It was now no longer necessary to store the diazo film in the dark.

Example 2

A hologram was recorded on a diazo film as used in Example 1 with the triangle arrangement described in Example 1. Exposure to light was performed by means of a UV laser (Type 52 A of Messrs. Coherent Radiation, wavelength 363.8 mm) and lasted 50 seconds. For the reconstruction of the image, the exposed undeveloped diazo film was irradiated with the red light of a He/Ne-Laser. The image appeared at a deflection angle greater than the cutting angle of the two partial beams for the recording with ultraviolet light, in correspondence with the ratio of the light wavelengths for recording and reconstruction. Recording and reconstruction were carried out with yellow ambient light. Until further use, the diazo film was stored in the dark.

A second hologram was produced on the same diazo film in addition to the hologram recorded there. For recording, the diazo film was turned through 90°. Upon radiation with the red light of a He/Ne-Laser, the separately reconstructed images of both holograms were obtained, the deflection directions of which were turned through 90° with respect to one another.

For stabilization of the holograms recorded on the diazo film, development was carried out with wet ammonia gas. For easier retrieval, headings in text in clear or code symbols were copied by conventional exposure in a field provided therefor and became visible upon development with ammonia gas.

Example 3

A biaxially stretched thermoset 50 $\mu$ thick polyethylene terephthalate film was coated with yellow light with a solution of the following composition: The following constituents were stirred into 50 parts by weight of a lacquer solution containing 30 parts by weight of cellulose-2,5-acetate per 500 parts by volume of chloroform: 10 parts by weight of 4-diethylamino-benzene diazonium chloride as the zinc chloride double salt, 80 parts by volume of acetate, 20 parts by volume of ethanol, and 5 parts by volume of a saturated solution of 2-hydroxy-3-naphthoic acid-p-tolyl-amide in tetrahydrofuran. The layer was dried for 30 minutes at room temperature and partially crystallized thereby. Exposure was carried out for 2 minutes as in Example 1 but with the unfiltered light of a mercury lamp. After reconstruction of the image by means of red laser light, another hologram was copied in contact onto the recording material but its carrier frequency was turned through about 20° with respect to that of the first recording. Eight holograms were thus duplicated on the diazo film which were each reconstructed in the meantime by means of red laser light. The eight images had about the same brightness. The crystalline areas of the layer yielded particularly bright images. For stabilization with respect to further exposure, the layer subjected to multiple exposure to light was exposed to wet ammonia gas.

The images reconstructed from this layer were particularly bright in comparison with those of Examples 1 and 2. For the comparison of intensity, a grid of 75 lines/mm was copied instead of a hologram. The intensity of the light diffracted in the first order was almost fifty times the intensity of the light in the zero order.

Example 4

The following constituents were each dissolved in 80 parts by volume of a 10 per cent aqueous solution of polyvinyl alcohol (2 per cent residual acetyl groups, K value according to Fikentscher = 70):

(a) 7 parts by weight of 4-morpholino-benzene diazonium chloride as the zinc chloride double salt, (b) 7 parts by weight of 4-morpholino-2,5-diethoxy-benzene diazonium chloride as the zinc chloride double salt, (c) 3 parts by weight of 4-pyrrolidino-3-methoxy-benzene diazonium chloride as the zinc chloride double salt, (d) 5 parts by weight of 2-dimethylamino-4,5-dimethyl-benzene diazonium chloride as the zinc chloride double salt.

The solubility may be improved by the addition of small quantities of acetone or isopropanol. Each of these solutions was whirl-coated onto a cellulose acetate film. The air-dry layers were dried for 2 minutes at 60°C. The reproduction materials obtained behaved as that of Example 3: Immediately after exposure to ultraviolet light, the images could be reconstructed with red laser light and further holograms then could be recorded with ultraviolet light. The light-sensitivity of the diazonium salts increases in the sequence (a), (b), (c). The diazonium salt mentioned under (d) absorbs in the relatively long-wave range and thus also could be irradiated with light in the blue or violet spectral range ($\gamma >$ 500 nm) for image recording. By the addition of coupling components, it is possible to produce azo dye images for stabilization.

Example 5

5 parts by weight of the 2,3,4-trihydroxy-benzophenone ester of naphthoquinone-(1,2)-diazide-(2)-5-sulfonic acid were dissolved in 100 parts by volume of acetone, whirl-coated onto 50 $\mu$ thick polyethylene terephthalate film and dried for 2 minutes at 60°C. According to the data of Example 2, a hologram was recorded with UV laser light (exposure time 45 seconds). A mask with an aperture of 2 × 3 mm was applied in front of the light-sensitive layer. The original was a pattern with black circles, of 15 provided circles 12 being recorded only. This image could be reconstructed with red laser light without an intermediate treatment of the exposed material, the arrangement of the circles given in the original being recognizable.

For further exposure, the mask was displaced by one aperture width and exposure was carried out through an original with another distribution of the circles. According to this process, a greater number of different sub-holograms could be recorded with UV laser light on the light-sensitive material and the corresponding image always could be reconstructed from each sub-hologram with red laser light. In order to erase the information stored in a sub-hologram, the corresponding area of the recording material was uniformly exposed to ultraviolet light.

After the penultimate intermediate exposure, the recording material was immersed for about 20 seconds in an aqueous alkaline developer solution of the following composition:

26.9 parts by weight of sodium metasilicate · 9 $H_2O$ 17.2 parts by weight of trisodium phosphate · 12 $H_2O$ 1.56 parts by weight of monosodium phosphate (anhydrous), and 464.0 parts by volume of water.

The material was dried without the surface having been previously wiped over.

Upon irradiation with red laser light, markedly intense images were obtained. When viewed through a microscope, a relief pattern could be observed. Also after this treatment, further holograms could be recorded on the material.

In a parallel test, a larger area of the recording material was irradiated with ultraviolet light in contact under an original, the exposed recording material was immersed in the above-indicated developer, aluminum was applied to the dried layer by vapor deposition, and the layer was then measured under an interference microscope. As the counting of the interference fringes shows, the exposed areas were higher than the unexposed areas. This means that the exposed areas swell under the influence of the aqueous alkaline developer. The swollen images obtained were maintained even after intensive drying of the layer over phosphorus pentoxide.

Example 6

2 parts of weight of the ester from 1 mole of 2,2'-dihydroxydinaphthyl-(1,1')-methane and 2 moles of naphthoquinone-(1,2)-diazide-(2)-5-sulfonic acid were dissolved in 100 parts by volume of tetrahydrofuran, whirl-coated onto polyester film and dried for 4 minutes at 70°C. The results obtained were analogous to those of Example 5. Immediately upon image-wise exposure to light, an image could be reconstructed with red laser light, the brightness of which could be considerably increased by wetting with an alkaline developer. Further image recordings still could be made after the treatment with the developer.

Example 7

A 50 $\mu$ thick polyethylene terephthalate film was coated with the following solution and dried.

1.0 part by weight of the diazo compound indicated in Example 5, 1.5 parts by weight of Zapon Fast Blue HFL (C.I. 2880), 0.5 part by weight of Sudan Blue II (C.I. 2883), 68.0 parts by weight of ethylene glycol monomethyl ether, 17.0 parts by weight of butyl acetate, and 15.0 parts by weight of cyclohexanone.

According to the data of Example 1, the color film obtained was exposed through a hologram original to ultraviolet light and, after immersion for 30 seconds in the developer solution indicated in Example 5, carefully rinsed with distilled water and dried. The film was handled with yellow ambient light. Upon irradiation of the hologram with red laser light, a very bright image of the original could be recognized. When the layer was viewed through the microscope a relief pattern could be observed without a reduction of the dye quantity in the exposed areas and thus a reduction of the layer having been provable by spectrophotometric control. Persumably, also in this case, the observed relief image results from a swelling of the exposed layer parts. The swollen image obtained was stable and maintained even after intense drying of the layer. Further holograms could be recorded on the thus exposed and swollen recording material by means of ultraviolet light from which holograms the images could be reconstructed with red laser light, optionally after swelling.

Example 8

A solution, saturated at 21°C, of N-p-tolylsulfonyl-benzoquinone-(1,4)-diazide-(4)-2-sulfonic acid-(2,5-dimethyl-phenyl)-amide in acetone was applied to polyethylene terephthalate film and dried for 1 minute at 60°C. After holographic image recording with ultraviolet light as in Example 2, an image could be reconstructed immediately with red laser light without an intermediate treatment. Further holographic recordings were possible.

After immersion for a few seconds in the following solution and subsequent drying, markedly brighter images were obtained:

36.0 parts by weight of sodium metasilicate · 9 $H_2O$, 7.5 parts by weight of polyethylene glycol (Polyglycol 6000), 1.44 parts by weight of levulinic acid, 0.74 part by weight of strontium hydroxide · 8 $H_2O$, and 2,410.0 parts by weight of water.

Further holographic recordings were possible.

Example 9

1 part by weight of cinnamaldehyde-N-phenyl-nitrone was dissolved in 50 parts by volume of methanol, applied to polyester film and dried for 2 minutes at 60°C. After holographic image recording with ultraviolet light, images could be immediately reconstructed with red laser light without an intermediate treatment. Further holographic recordings were possible. The recordings could be fixed by wiping over with weakly acid buffered developer solution by dissolving the non-hardened layer parts.

Example 10

2 parts by weight of C-(4-azido-phenyl)-N-phenyl-nitrone were dissolved in 50 parts by volume of methanol, whirl-coated onto polyester film and dried for 2 minutes at 60°C. After holographic image recording with ultraviolet light, images could be reconstructed with red laser light without an intermediate treatment. Further holographic image recordings were possible. The holograms could be fixed as in Example 9.

It will be obvious to those skilled in the art that many modifications may be made within the scope of the present invention without departing from the spirit thereof, and the invention includes all such modifications.

What is claimed is:

1. A process for the production of holograms wherein a phase hologram of an image is recorded, which process comprises exposing a transparent light-sensitive reproduction material, having a light-sensitive layer on a transparent support, to an object beam and a reference beam of actinic coherent light whereby a phase hologram of the object is produced, said light-sensitive layer consisting essentially of a light-sensitive compound selected from the group consisting of an aromatic diazonium compound, a quinone diazide, and an aromatic nitrone, whereupon a visible image is immediately reconstructible from the obtained hologram by passing non-actinic coherent light through the exposed transparent light-sensitive reproduction material, and then recording at least one further hologram onto the same material by means of actinic light, either on the same area by varying the spatial frequency or by varying the plane of the incident beams, or on another area of said material, whereupon the images from the different holograms are independently reconstructible.

2. A process for the production of duplicate holograms wherein a phase hologram of an image is copied, which process comprises exposing a transparent light-sensitive reproduction material, having a light-sensitive layer on a transparent support, to actinic light in contact under a master hologram such that a duplicate hologram is produced, said light-sensitive layer consisting essentially of a light-sensitive compound selected from the group consisting of an aromatic diazonium compound, a quinone diazide, and an aromatic nitrone, whereupon a visible image is immediately reconstructible from the obtained duplicate hologram by passing non-actinic coherent light through the exposed transparent light-sensitive reproduction material, and then copying at least one further hologram onto the same material by means of actinic light, either on the same area by using a master hologram of a different spatial frequency or by turning the reproduction material with respect to the further hologram to be copied about an axis vertical to the plane of the hologram, or on another area of said material, whereupon the images from the different duplicate holograms are independently reconstructible.

3. A process according to claim 1 in which the light-sensitive layer is embedded in the surface of the support.

4. A process according to claim 1 in which a recording material is used which contains an aromatic diazonium salt as the light-sensitive compound, and the recorded holograms are fixed after the last exposure to actinic light by alkaline development in the presence of a coupling component.

5. A process according to claim 1 in which a recording material is used which contains a quinone diazide as the light-sensitive compound, the hologram is swollen after exposure to actinic light by immersion in a developer solution, and the swollen hologram is dried.

6. A process according to claim 5 in which further holograms are added by exposure to actinic light, swelling, and drying.

7. A process according to claim 6 in which the recorded holograms are fixed by full exposure to actinic light.

8. A process according to claim 4 in which the light-sensitive compound is an aromatic diazonium salt having a secondary or tertiary amino group in the 4-position.

9. A process according to claim 5 in which the quinone diazide is a naphthoquinone-(1,2)-diazide-(2)-4- or 5-sulfonic acid ester.

10. A process according to claim 2 in which the light-sensitive layer is embedded in the surface of the support.

11. A process according to claim 2 in which a reproduction material is used which contains an aromatic diazonium salt as the light-sensitive compound, and the copied holograms are fixed after the last exposure to actinic light by alkaline development in the presence of a coupling component.

12. A process according to claim 2 in which a reproduction material is used which contains a quinone diazide as the light-sensitive compound, the hologram is swollen after exposure to actinic light by immersion in a developer solution, and the swollen hologram is dried.

13. A process according to claim 12 in which further holograms are added by exposure to actinic light, swelling, and drying.

14. A process according to claim 13 in which the copied holograms are fixed by full exposure to actinic light.

15. A process according to claim 11 in which the light-sensitive compound is an aromatic diazonium salt having a secondary or tertiary amino group in the 4-position.

16. A process according to claim 12 in which the quinone diazide is a naphthoquinone-(1,2)-diazide-(2)-4- or 5-sulfonic acid ester.

* * * * *